United States Patent
Thyni et al.

(10) Patent No.: US 8,917,724 B2
(45) Date of Patent: Dec. 23, 2014

(54) METHOD AND ARRANGEMENT FOR PERFORMING LINK AGGREGATION

(75) Inventors: Tomas Thyni, Jarfalla (SE); Christian Gotare, Getinge (SE); Johan Kolhi, Vaxholm (SE); Annikki Welin, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 178 days.

(21) Appl. No.: 13/581,110

(22) PCT Filed: Feb. 25, 2010

(86) PCT No.: PCT/SE2010/050221
§ 371 (c)(1),
(2), (4) Date: Aug. 24, 2012

(87) PCT Pub. No.: WO2011/105941
PCT Pub. Date: Sep. 1, 2011

(65) Prior Publication Data
US 2012/0320914 A1     Dec. 20, 2012

(51) Int. Cl.
*H04J 1/00*    (2006.01)
*H04L 12/935*  (2013.01)
*H04L 12/741*  (2013.01)
*H04L 12/803*  (2013.01)
*H04L 12/709*  (2013.01)

(52) U.S. Cl.
CPC .............. *H04L 49/30* (2013.01); *H04L 45/745* (2013.01); *H04L 45/245* (2013.01); *H04L 47/125* (2013.01)

USPC ........................... 370/389; 370/244; 370/229

(58) Field of Classification Search
None
See application file for complete search history.

(56) References Cited

U.S. PATENT DOCUMENTS

| | | | |
|---|---|---|---|
| 6,778,495 B1 | 8/2004 | Blair | |
| 7,787,370 B1* | 8/2010 | Aweya et al. | 370/230 |
| 7,940,661 B2* | 5/2011 | Ervin et al. | 370/232 |
| 8,625,427 B1* | 1/2014 | Terry et al. | 370/235 |
| 2007/0067497 A1* | 3/2007 | Craft et al. | 709/250 |
| 2007/0133559 A1* | 6/2007 | Ko et al. | 370/395.21 |
| 2008/0298236 A1 | 12/2008 | Ervin et al. | |
| 2009/0080328 A1 | 3/2009 | Hu et al. | |
| 2012/0011101 A1* | 1/2012 | Fang et al. | 707/654 |
| 2012/0163180 A1* | 6/2012 | Goel | 370/238 |
| 2013/0003549 A1* | 1/2013 | Matthews et al. | 370/235 |
| 2014/0016470 A1* | 1/2014 | Li | 370/235 |

* cited by examiner

*Primary Examiner* — Kibrom T Hailu

(57) ABSTRACT

A method for performing a link aggregation on a link aggregation group, comprising a plurality of transport links, for sessions received at a first network node which is connected to a second network node via the link aggregation group. The method, which is to be executed in the first network node, enables link aggregation optimization for the sessions destined for the second network node by selectively choosing transport link for the sessions on the basis of the load of the transport links. The suggested link aggregation results in a packet load balancing and improved bandwidth utilization. An arrangement suitable for executing the suggested method is also provided.

15 Claims, 4 Drawing Sheets

METHOD AND ARRANGEMENT FOR PERFORMING LINK AGGREGATION

TECHNICAL FIELD

The present invention relates to a method and arrangement for performing link aggregation at a network node of a communication system.

BACKGROUND ART

Link aggregation is a commonly known technique for interconnecting network nodes, such as routers or switches via multiple network cables or ports, which are connected in parallel for the main purpose of increasing the link speed beyond the limits of any one single cable or port. In addition, link aggregation may be used for the purpose of increasing the redundancy for higher availability. Due to the use of parallel links, improvements of the transmission performance may be obtained using existing hardware, since, at least to some extent, no upgrading to a higher-capacity link technology will be necessary.

Most implementations now conform to what used to be clause 43 of IEEE 802.3-2005 Ethernet standard, usually still referred to by its working group name of "IEEE 802.3ad". The definition of link aggregation has since moved to a standalone IEEE 802.1AX standard.

Link aggregation commonly used today is restricted to base its aggregation on session load, thereby taking no consideration to the actual load of the available transport links. By applying such an aggregation strategy, there is a great risk of uneven bandwidth load on individual transport links in the link aggregation group (LAG), and, as a consequence poor utilization of the total bandwidth which is available for the LAG.

A typical scenario for applying link aggregation according to the prior art is illustrated in FIG. 1, where two network nodes 100, 101, which may typically be switches or routers, are interconnected via a plurality of transport links, in the present case three different links, 102a, 102b, 102c, which together form a Link Aggregation Group (LAG) 103, or more specifically an Ethernet LAG. For sessions fed to network node 100 via link 104, a link aggregation is used when the packets of the sessions are to be transmitted to network node 101 over any of the transport links of the LAG 103 in an efficient way.

When trying to optimize the load balancing over the available transport links in solutions available today, link aggregation is based solely on session load, thereby taking no consideration to the actual load of the available transport links. A typical scenario for session load balancing of a LAG according to the prior art is illustrated in FIG. 2, where packets of incoming sessions are to be distributed to any of the transport links of LAG 103.

Assuming in the present example that a total of 3000 sessions are received on a transport link 104, while, after a session load balancing has been commenced, each transport link 102a, 102b, 102c is used for transportation of 1000 sessions. A conventional link aggregation will force sessions with the same source and destination to use the same transport link. However, since each session often use different amounts of bandwidth, and may also use different packet sizes, the actual load of each transport link will differ considerably, such that e.g. the load of transport link 102a is 10%, the load of transport link 102b is 30%, while link 102c have the remaining load of 60%.

By applying a session load balanced link aggregation strategy, there is obviously a great risk of obtaining an uneven bandwidth load on individual transport links of the LAG, and, as a consequence, of obtaining poor utilization of the total bandwidth which is available for the LAG.

SUMMARY OF INVENTION

An object of the present document is to address at least some of the problems mentioned above. More specifically, what is suggested in the present document is a method which provides for a more efficient load balancing of a link aggregation, where sessions are distributed over available transport links by applying packet load balancing. An arrangement which is suitable for performing the suggested method is also provided.

The suggested link aggregation approach aims at providing a more even link load across the available transport links and a more efficient bandwidth utilization of the transport links, especially in situations where the bandwidth requirements associate with different sessions which rely on the same link aggregation vary a lot.

According to one aspect, a method for performing a link aggregation on a link aggregation group (LAG), comprising a plurality of transport links, for sessions received at a first network node connected to a second network node via the link aggregation group, is provided.

According to the suggested method, the link aggregation is optimised for the sessions destined for the second network node by selectively choosing transport link for the sessions on the basis of the load of the transport links. By basing the selection of transport link for the sessions on the load of the transport links, rather than on information associated with the transmission route, such as e.g. the respective source and destination of the sessions, as is commonly done during link aggregation, a more efficient load balancing can be provided.

The suggested method can also be described as a method for obtaining a link aggregation which can be optimized by selecting transport link for received sessions such that the relative bandwidth utilisation of the transport links is balanced over the link aggregation group.

Furthermore, the suggested method for selectively choosing transport link for the received sessions also comprises the option of moving at least one of the sessions between at least two different transport links of the link aggregation group, while being traversed via the link aggregation group.

In order to be able to select transport channel based on the load of the transport links, the method will provide for that the load of the transport links are determined. According to one embodiment, this may be achieved by considering a buffer depth associated with a respective transport link, for each transport link, and to consider the transport link having the smallest buffer depth as the least loaded transport link. The buffer depth may be determined by using any type of known buffer monitoring or determining mechanism.

More specifically, the suggested method is based on executing a caching on received packets associated with a plurality of sessions, and by selecting a transport link for a packet on the basis of the outcome f the caching process.

Initially a hashing is executed on the basis of content of a most recently received packet. Subsequent to the hashing, it is determined whether a hash associated with a previously received packet of the same session is present in a cache. If, in response to the hashing it was found that a hash associated with a previously received packet of the same session is present in the cache, the same transport link as was selected for the previously received packet is selected also for the most recently received packet, while in case instead no hash associated with a previously received packet of the session was found in the cache, a least loaded transport link is selected for the most recently received packet. In the latter case a new entry for the session is also created in the cache, wherein the new entry is provided with the hash associated with the session and the selected transport link. With the new entry entered into the cache, subsequent packets of the same session will be identifiable and associated with transport link presently associated with the session.

In order to enable control of the timing between consecutive packets of a session, a timer function is also suggested. According to one embodiment, a timer function is suggested which is operable such that in case a least loaded transport link was selected for a most recently received packet of a session, a timer associated with the session is started, or such that in case the same transport link as was selected for the previously received packet was selected also for the most recently received packet prior to recognizing a time out of said timer, a timer associated with the session is instead re-set.

If is found that, upon time-out of a timer associated with the session, no subsequent packet of the same session has been received, the cache is cleared of an entry associated with the session. As a consequence from such a clearing of the cache, no match will be found at a subsequent hashing of a subsequent packet of the session, resulting in a new selection of a least loaded transport link for such a packet.

According to another aspect, an arrangement suitable for implementation at a network node, and for performing the method described above, is also provided, where the arrangement comprises at least a selecting unit which is configured to optimize a link aggregation for sessions received by the arrangement and destined for the second network node by selectively choosing transport link for the sessions on the basis of the load of the transport links.

The selecting unit is further configured to determine the load of the plurality of transport links. According to one embodiment the selecting unit may therefore be configured to consider the buffer depth of buffers of the arrangement, where each buffer is associated with a respective transport link, and to consider the transport link having the smallest buffer depth as the least loaded transport link. The suggested load determining mechanism may be implemented using any conventional load determining functionality.

Furthermore, the arrangement also comprises a receiving unit for receiving packets of sessions and a hashing unit for performing a hashing on the respective received packets. The hashing unit is configured to execute a hashing on the basis of content of the most recently received packet, and wherein the selecting unit is configured to determine, on the basis of information from the hashing unit, whether or not a hash associate with a previously received packet of the session is found in a cache, and to select the same transport link as was selected for the previously received packet also for the most recently received packet, in case a hash associate with previously received packet of the same session was found in the cache. If no hash associated with a previously received packet of the same session was found in the cache, the selecting unit is instead configured to select a least loaded transport link for the most recently received packet.

In addition, the selecting unit is further configured to generate a new entry for a session in the cache in association with selecting a least loaded transport link for that session.

The selecting unit is also configured to determine the timing between consecutive packets of a session air such a purpose, the selecting unit may be configured to control a timer function, such that a timer associated with a session is started, in case a least loaded transport link was selected for the most recently received packet of the session, and such that a timer associated with the session is re-set in case the same transport link as was selected for the previously received packet was instead selected also for the most recently received packet prior to recognising a time out of the timer.

The selecting unit is further configured to clear the cache of an entry associated with a session in case no subsequent packet of this session has been received upon time-out of a timer associated with the session.

Further details and features of the suggested method and the associated arrangement, as well as its benefits, will be explained in further detail in the detailed description following below.

BRIEF DESCRIPTION OF DRAWINGS

The invention will now be described, by way of example, with reference to the accompanying drawings, in which.

DESCRIPTION OF EMBODIMENTS

The claimed invention refers to a method for performing transport link aggregation, which is implemented on a network node, such as e.g. a switch or a router, connected to another network node, which may typically be another switch or router, via a plurality of transport links forming a LAG.

For the purpose of obtaining a better session load balancing on the LAG, an alternative approach for selecting transport link is introduced, where, instead of basing a selection of transport link on issues such as e.g. source and destination of received packets, the least loaded transport link is selected for a session, and wherein the link may be maintained for the session as long as certain timing conditions are fulfilled.

Figure 1:
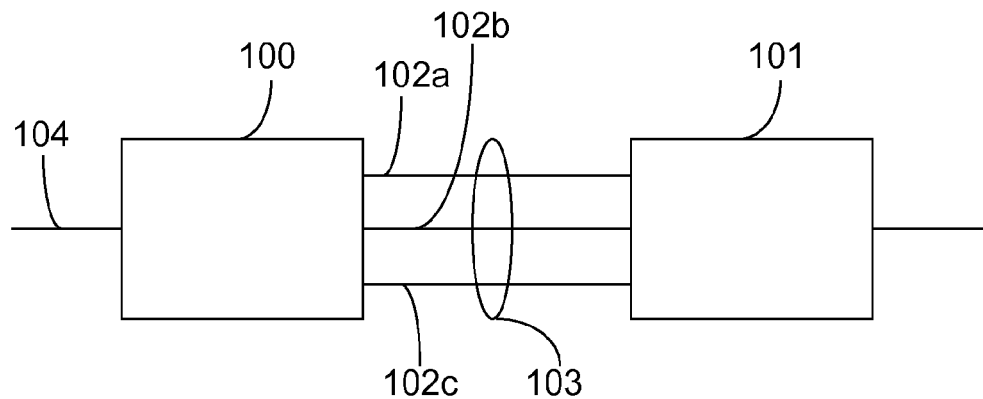
FIG. 1 is a simplified illustration of a system configuration suitable for link aggregation, according to the prior art.
Figure 2:
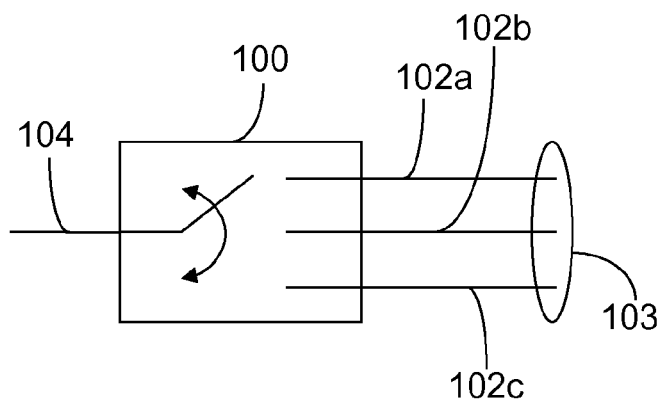
FIG. 2 is a simplified illustration of a session load balanced link aggregate, according to the prior art.
Figure 3:
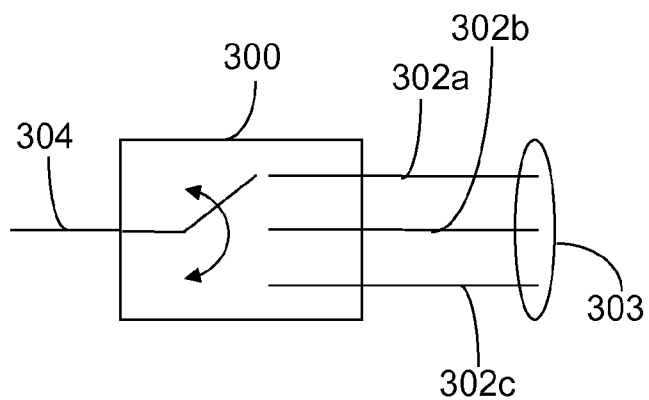
FIG. 3 is a simplified illustration of a packet load balanced link aggregate.

FIG. 3 is a schematic illustration of an exemplary link aggregate, executed on a network node 300, which is based on packet load balancing on a LAG 303, aiming at obtaining an even link load across all available transport links 302a, 302b, 302c, without having any risk of packet reordering. Compared to the embodiment of FIG. 2, packet load balancing will result in a more efficient bandwidth utilization, such that for the present example approximately ⅓ of the available bandwidth will be used by each transport link. During link aggregate involving a plurality of sessions, a session may be moved between different transport links as long as the packet order of packets distributed via the LAG can be maintained.

For a session being distributed at intense packet rates, a selected transport link will most likely not have to be changed for the duration of the session. If, however, a link is to be changed for a session, a minimum requirement is that the latest packet of the session to be transmitted via a selected transport link prior to a decided change has traversed the link to be replaced, and that the transmitting of a subsequent packet is started on the next-hop link, when the transport link change takes place.

The suggested method and arrangement enables a more optimized utilization of the link aggregate, or, in other words of the bandwidth utilization of a LAG. Balancing of used bandwidth is becoming a growing challenge with services with bandwidth requirements which mutually may vary considerably, from low bandwidth services such as e.g. Facebook sessions, to more bandwidth demanding services, such as e.g. HD-TV sessions.

In addition, the suggested method is particularly suitable for supporting long lived sessions, having a relatively high bandwidth variation over time, i.e. the type of packet based services which are being used more frequently on commercially available network, and which are also very likely to become even more popular in the near future.

Figure 4:
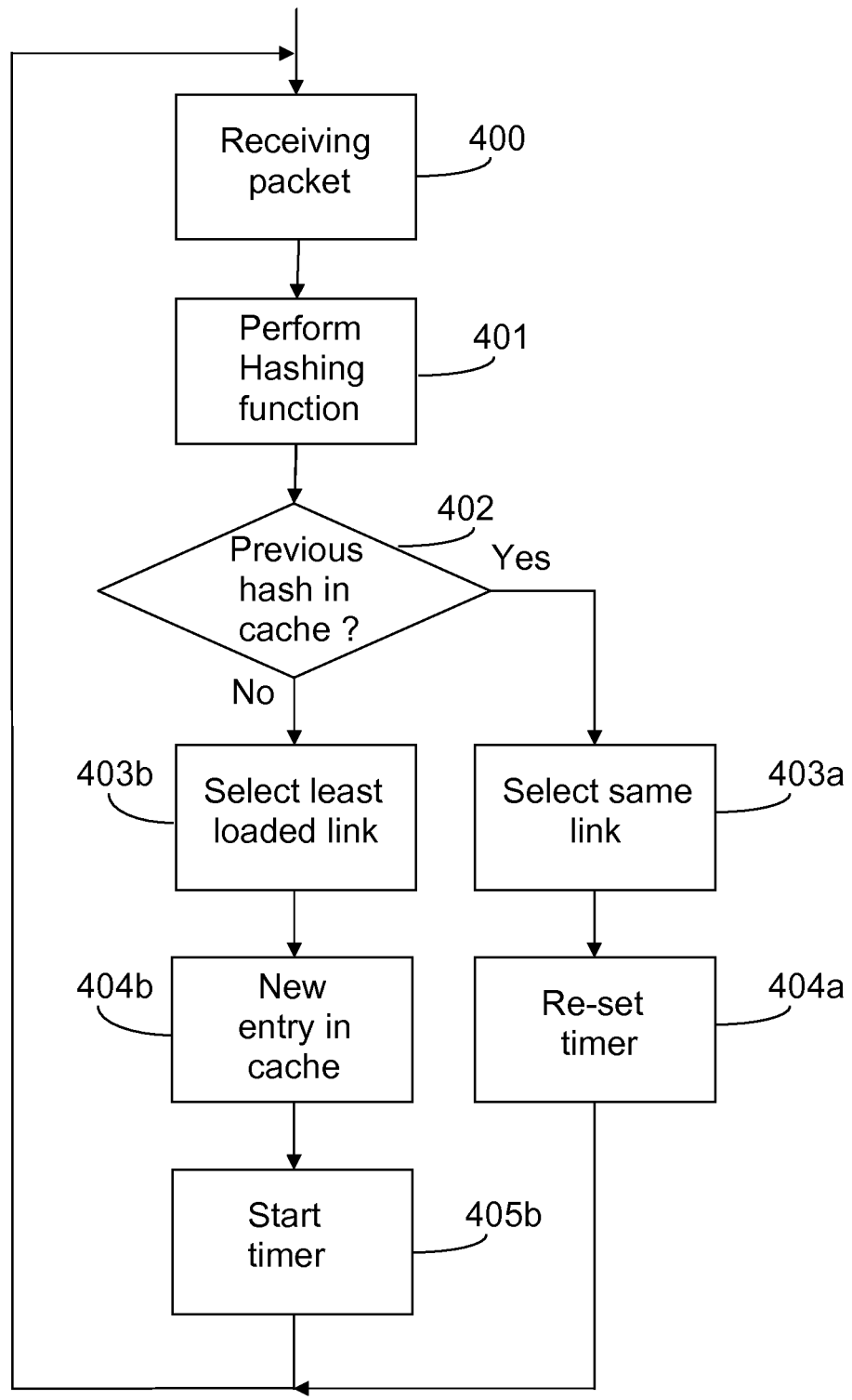
FIG. 4 is a flow chart illustrating a method for performing packet load balanced aggregate, according to exemplary embodiment.

A transport link aggregation method which is based on packet load balancing can be described according to the flow chart of FIG. 4, where consecutive packets, typically belonging to a plurality of sessions, are being processed by a link aggregation session hashing algorithm one by one as they are being received by a link aggregation arrangement.

In order to be able to select transport link for packet received by the arrangement, as indicated with a first step 400, each packet is being exposed to a transport link aggregation session hashing where the result from the hashing is compared to a cache, typically by consulting a hashing table, of the arrangement. A transport link aggregation session hashing is therefore indicated with a next step 401.

More specifically, during hashing a part of the content of a received packet, typically comprising information on the source and destination of the packet, is used as input data for the hashing algorithm. As will be described in further detail below, if certain timing conditions are fulfilled, the hashing will result in a match for the session, and thus, a transport link which is presently used for the respective session is selected also for the present packet, while, in case of no match in the caching process, a transport link out of the available links has to be selected for the session, taking the overall packet load into consideration. Hashing is a commonly known procedure for data comparison tasks, such as the presently described link aggregation task, and thus, the hashing process as such will therefore not be discussed in any further detail in this document.

For a packet being exposed to the hashing algorithm, and belonging to a specific session, a match, is to be interpreted as an indication that a previously received packet of the same session is still in a buffer interfacing the LAG. If, on the other hand, more time than permitted has lapsed since the most previous packet of the session was sent from a buffer, the hash associated with the session will be cleared from the cash. This evaluation is performed in a step 402. Consequently, If the hash associated with the present session is found in the hashing process executed on content of a most recently received packet, this is an indication that at least one more previously received packet belonging to the same session has been put in a buffer of one of the available transport links of the LAG, and, thus, the same transport link, or interface of the LAG, as was selected for that packet will be selected also for the most recently received packet, as indicated with step 403*a*.

However, if the received packet is the first packet of the session, or if the time interval since the previously received packet of the same session exceeds a predefined time interval, there will be no match in the cache for the relevant session, and as a consequence, a transport link has to be selected for the packet and the session. As already mentioned above, the least loaded transport link is selected. This is indicated with another step 403*b*. In order to be able to select the least loaded transport link, a separate monitoring process for monitoring the buffer depth of the available transport links of the JAG is continuously running in parallel to the described method.

Once a transport link has been chosen for a packet, according to steps 403*b*, a new entry is created for the session in the cache, as indicated with a subsequent step 404*b*, thereby enabling a selection of the same transport link also for a subsequent packet of the same session, subsequent to having executed a successful hashing on content of the subsequent packet. The created entry will comprise a hash, which will from now on, until it is cleared due to a timer time-out, be associated with the session, and can also be seen as an indicator of, or link to, the chosen transport link.

In addition, a timer associated with the session is started in association with selecting the least loaded transport link for a packet. The main purpose with such a timer is to set up an upper time limit for use of the same transport link for consecutive packets belonging to the same session. The starting of the timer is indicated with another step 405*b*, after which a subsequently received packet can be processed in step 400. It is to be understood, that one dedicated timer will be running for each ongoing session, such that, if the time of arrival between two consecutive packets of a session exceeds the timer value of the timer associated with the session, the session may be moved to another transport link, as the next packet of the session will be sent on the least loaded transport link. The timer value should be chosen, such that the duration between consecutive packets of the same session is long enough to prohibit packet reordering. By way of example, a timer value which has been set to 2T, where T is the transmission time between the network node where the link aggregation is to be executed and another inter-connected network node, will normally meet this requirement satisfactory. It is, however to be understood that other values may be more suitable, depending on the type of traffic traversing the network node.

As is evident from FIG. 4, the described process is then repeated for next received packet, which may be a packet of any of a plurality of sessions, and If in such a subsequent loop yet another packet belonging to the same session as a previously received packet is identified in step 402, and, thus, the same transport link as for the previously received packet is selected also for this packet in a subsequent step 403*a*, the transport link timer will be updated, i.e. re-set, as indicated with a step 404*a*, after which yet another processing sequence may commence, as long as there are packets arriving.

Figure 5:
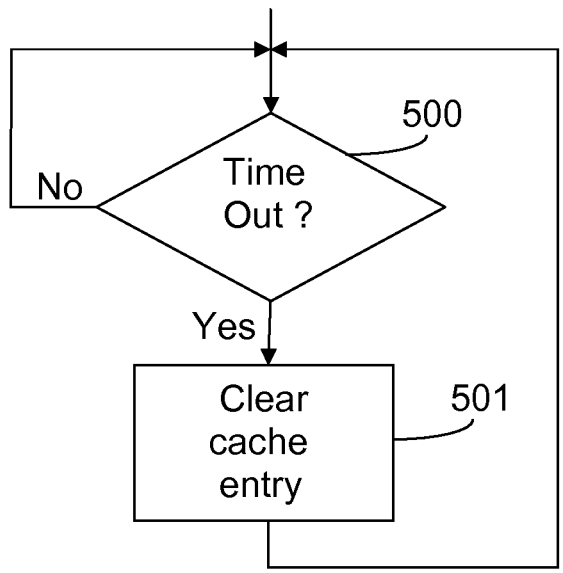
FIG. 5 is a flow chart illustrating a process for monitoring timer functions used by the method of FIG. 4.

A timer monitoring process which is running in parallel to the main process described above with reference to FIG. 4, having the main purpose of monitoring all running timers will now be described with reference to FIG. 5. As indicated with a first step 500, the process monitors the timers which have been started in association with selecting a transport link for a session. Upon detecting a time-out of a timer, the cache is cleared of the hash associated with the respective session, as indicated with a next step 501, after which the process commence with monitoring remaining timers.

Figure 6:
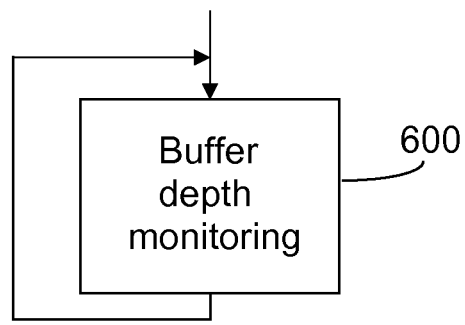
FIG. 6 is a flow chart illustrating a process for monitoring the buffer depth of buffers of a link aggregation group for supporting the method of FIG. 4.

As already mentioned above, a process for determining which transport link that is least loaded will be required. Such a buffer depth monitoring or interrogating mechanism may e.g. be based on the well known method of continuous monitoring of buffer pointers of a memory of the network node. Since there are also other commonly known methods for performing buffer depth monitoring and since this mechanism as such is out of the scope of this invention, these issues will not be discussed in any further detail in this document. As illustrated in FIG. 6, the basic principle for obtaining the required buffer depth information at any time is that some kind of buffer depth monitoring process, wherein the buffer depth of the respective buffers of each available transport links of a LAG, is being monitored, on a more or less continuous basis. In addition to the timer monitoring process of FIG. 5, also the buffer depth monitoring process of FIG. 6 is to be run in parallel to the method/process of FIG. 4, thereby enabling selection of a transport link on the fly, whenever a link needs to be selected.

It is to be understood that the process steps described above, merely described one possible way of executing a link aggregate, which is based on packet load balancing, and that a link aggregate which is based on these principles may also be executed in other alternative ways, as long as a corresponding hashing process, which rely on appropriate timing between consecutive packets belonging to the same session, and information on which transport link that is presently least loaded.

Figure 7:
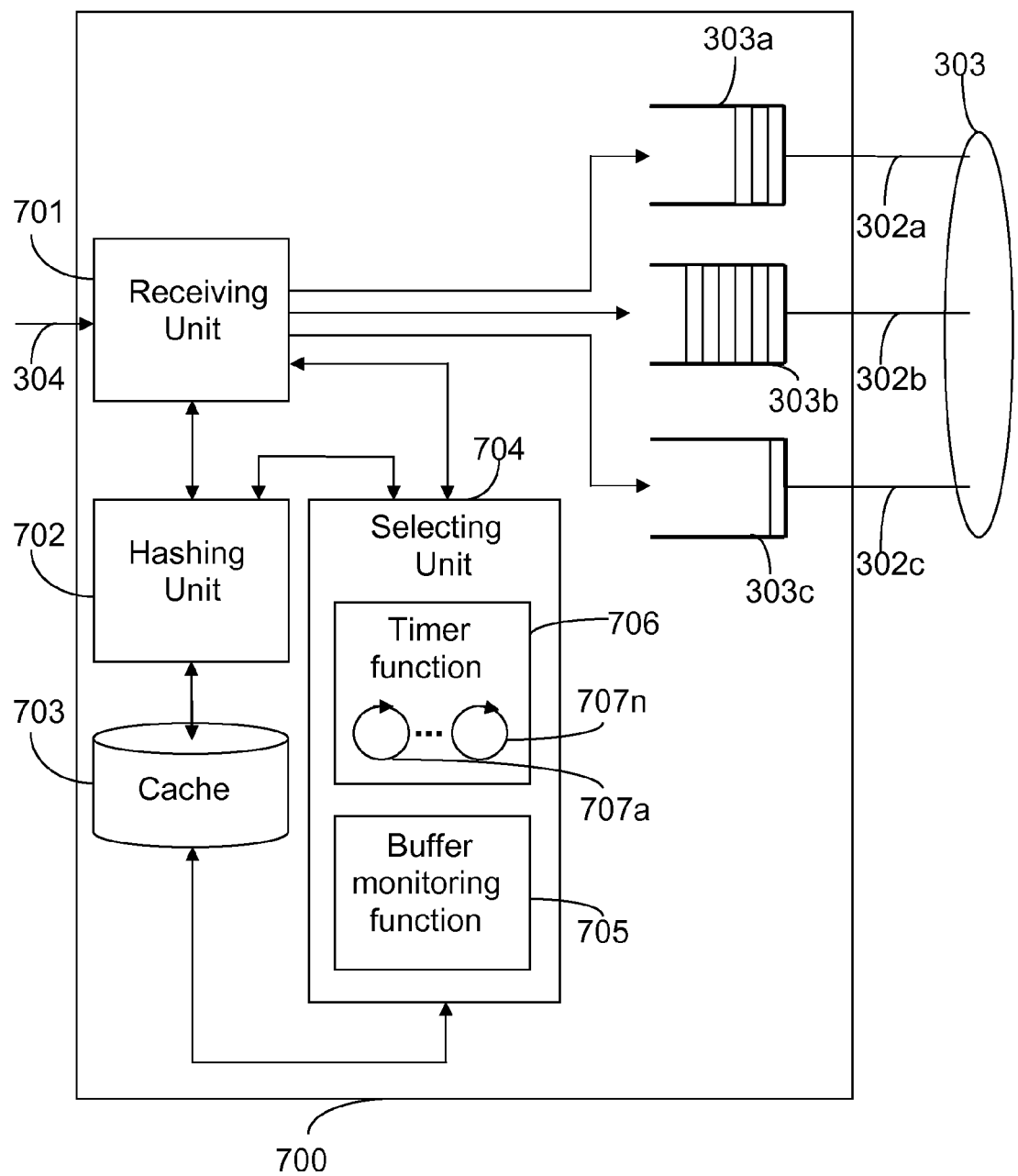
FIG. 7 is a simplified block scheme, illustrating an arrangement configured to execute the method and associated process of FIGS. 4 to 6.

One way of enabling execution of the suggested link aggregation method on a network node, such as e.g. a switch or router, will now be described in further detail with reference to the arrangement of FIG. 7. However, it is to be understood that FIG. 7 is an exemplifying, simplified example of one possible arrangement, which may be implemented on any network node which is suitable for performing link aggregation. Furthermore, the chosen naming of the described functional units only serve as examples, and should not be seen as a limiting factor for these functional unit.

More specifically, is to be understood that the configuration suggested in FIG. 7 comprises a number of interconnected generic functions, which may be implemented as hardware, software or a combination of both, and that when implemented in a network node, the functional unit forming the suggested arrangement, which will typically be implemented as an integrated part of the network node on which a link aggregate is to be applied, may be combined in an alternative way, and may also comprise additional functionality, which may be commonly used in the present context. However, for simplicity reasons, any functional unit which is not necessary for the understanding of the suggested principles for achieving link aggregation which is based on packet load balancing, have been omitted for simplicity reasons.

The arrangement 700 of FIG. 7 comprises a link 304 on which packets of a plurality of sessions may be received from one or more data sources (not shown) via a conventional receiving unit 701. The arrangement 700 is configured to enable link aggregation of the received sessions onto a LAG 303, such that transmission to another network node (not shown) is provided. Arrangement 700 comprises a hashing unit 702, which is connected to receiving unit 701 and configured to perform a hashing algorithm on received packets, on a packet by packet basis, on the basis of information obtained from the respective packet, and an associated cache 703, for maintain hashes, or hash values, associated with received active sessions. The hashing algorithm may be based on any type of conventional hashing function principles. However, in order to be able manage a large number of sessions in a more efficient manner, the hashing algorithm may rely on more bits than what is commonly required. By way of example any choice of bits between 4 to 16 bits may be applied by the algorithm.

In addition, arrangement 700 comprises a selecting unit 704 which is configured to provide for optimized utilization of the LAG 303 for the plurality of incoming sessions destined for the network node by selectively choosing transport link for consecutive packets of the incoming sessions. As already mentioned above, such a selection is to be executed on the basis of the packet load of the respective transport links, here represented by the three transport links 302*a*, 302*b*, 302*c*, each of which is connected to a respective buffer 303*a*, 303*b*, 303*c*. The buffers 303*a*, 303*b*, 303*c* are configured to buffer the packets to be distributed via LAG 303 according to conventional buffering procedures. It is to be understood that a typical embodiment of the suggested arrangement 700 will also comprise a transmitter, which, however, has been omitted in the given exemplary embodiment.

The selecting unit 704 is configured to base its selection of transport link for a received packet on presence or absence of an associated hash in the cache 703. For that reason, the selecting unit 704 is configured such that it is able to recognize, or become aware of, a packet arriving at the receiving unit 701. In addition, selecting unit 704 is configured to respond to recognizing a received packet by interrogating the cache 703 for determining whether or not it comprises a hash which is associated with the session for which a transport link is to be selected.

Depending on the outcome of the interrogation of the cache 703, the packet received by receiving unit 701 is to be put in a buffer 303*a*, 303*b*, 303*c* of one of the available transport link 302*a*, 302*b*, 302*c*. In the present arrangement this is achieved by the selecting unit 703 being configured to control the receiving unit 704, such that a respective packet is forwarded to a selected transport link buffer 303*a*, 303*b*, 303*c*, but such forwarding into the appropriate buffer may alternatively be executed by a separate unit, especially dedicated for this purpose and controlled by the selecting unit 704.

As mentioned above the suggested link aggregate method rely on some kind of buffer depth monitoring or interrogating mechanism which is to be running in parallel to the main link aggregate method. The selecting unit 704 may be configured to execute such a parallel process, here represented by buffer monitoring function 705. Alternatively, a separate unit dedicated for the purpose of determining which transport link that is the least loaded link may be connected to and controlled by the selecting unit 704.

The selecting unit 704 of FIG. 7 is also configured to control and monitor a timer function, comprising a timer for each session for which consecutive packets are arriving to the arrangement 700, such that upon selecting a least loaded transport link for a packet, a timer is started for the respective session, and such that for a session for which a subsequent packet is received prior to time-out of a running timer of a session, the timer is re-set, such that a new timer cycle can commence for this session.

The suggested timers are represented by timer function 706 in FIG. 7, where one associated timer, here represented by timers 707*a* to 707*n*, is running for each active session, here referred to as session a to session n. The timer function 706 may typically be implemented as a software function of the selection unit 704, or as a separate timer function unit, which is connected to and controlled by the selecting unit 704.

In association with selecting a least loaded link a new entry associated with the respective session is to be added to the cache, while upon timer time-out, the corresponding entry is to be removed from the cache. Therefore, the selecting unit is also configured to modify the cache 703 accordingly.

While the present invention has been described with reference to exemplary embodiments, the description is generally only intended to illustrate the inventive concept and should not be taken as limiting the scope of the invention, which is defined by the appended claims.

ABBREVIATIONS

HD-TV High Definition Television
LAG Link Aggregation Group

The invention claimed is:

1. A method for performing a link aggregation on a link aggregation group, comprising a plurality of transport links, for sessions received at a first network node which is connected to a second network node via the link aggregation group, the method being executed in the first network node, wherein the link aggregation is optimized for the sessions destined for the second network node by selectively choosing a transport link for said sessions on the basis of a load on the transport links, the method comprising:

for a most recently received packet of one of said sessions:
executing a hashing on the basis of content of the most recently received packet;
determining whether a hash associated with a previously received packet of said session is present in a cache, and
selecting, for the most recently received packet, a same transport link that was selected for the previously received packet, when a hash associated with a previously received packet was found in the cache, or
selecting, for the most recently received packet, a least loaded transport link and creating a new entry for said session in the cache, wherein said new entry is provided with the hash associated with said session and the selected transport link, in case no hash associated with a previously received packet of said session was found in the cache.

2. A method according to claim 1, wherein the link aggregation is optimized by selecting transport link for said sessions such that the relative bandwidth utilization of the transport links is balanced over the plurality of transport links of the link aggregation group.

3. A method according to claim 1, wherein selectively choosing transport link for the received sessions comprises the step of moving at least one of the sessions between at least two of the transport links on the basis of the load of the transport links.

4. A method according to claim 1 comprising the further step of:
determining the load of the transport links by considering, for each of said transport links, a buffer depth associated with the respective transport link, wherein the transport link having the smallest buffer depth is considered as the least loaded transport link.

5. A method according to claim 1, comprising the following further steps of:
starting a timer associated with said session when the least loaded transport link was selected for the most recently received packet of said session, or
re-setting a timer associated with said session when the same transport link as was selected for the previously received packet was selected also for the most recently received packet of said session prior to recognizing a time out of said timer, or
clearing the cache of an entry associated with said session when no subsequent packet of the same session has been received upon time-out of a timer associated with said session.

6. A method according to claim 5, wherein the timer is set to a value that exceeds or is equal to T, where T is the transmission time from the first network node to the second network node.

7. An arrangement at a first network node for performing a link aggregation on a link aggregation group, said arrangement comprising:
a plurality of transport links for sessions received at the first network node, which is connected to a second network node via the link aggregation group;
a selecting unit that is configured to optimize the link aggregation for the sessions destined for the second network node by selectively choosing a transport link for said sessions on the basis of a load on the transport links; and
a receiving unit for receiving a packet of one of said sessions and a hashing unit, wherein the hashing unit is configured to execute a hashing on basis of content of the received packet, being the most recently received packet, and wherein the selecting unit is configured to determine, on the basis of information from the hashing unit, whether or not a hash associated with a previously received packet of said session is in a cache, and to select, for the most recently received packet, the same transport link that was selected for the previously received packet, when a hash associated with a previously received packet was found in the cache, or to select a least loaded transport link for the most recently received packet, when no hash associated with a previously received packet of said session was found in the cache.

8. An arrangement according to claim 7, wherein the selecting unit is configured to perform an optimized link aggregation by selecting transport link for said sessions such that the relative bandwidth utilization of the transport links is balanced over the plurality of transport links of the link aggregation group.

9. An arrangement according to claim 7, wherein the selecting unit is further configured to selectively choosing transport link for the received sessions by moving at least one of the sessions between at least two of the transport links on the basis of the load of the transport links.

10. An arrangement according to claim 7, wherein the selecting unit is further configured to determine the load of the transport links by considering, for each of said transport links, a buffer depth of a buffer, associated with the respective transport link, and to consider the transport link having the smallest buffer depth as the least loaded transport link.

11. An arrangement according to claim 7, wherein the selecting unit is further configured to generate a new entry for said session in the cache, in association with selecting a least loaded transport link for that session.

12. An arrangement according to claim 7, wherein the selecting unit is further configured to control a timer function such that:
a timer associated with said session is started when a least loaded transport link was selected for the most recently received packet of said session, and
a timer associated with said session is re-set when the same transport link as was selected for the previously received packet was selected also for the most recently received packet prior to recognizing a time out of said timer.

13. An arrangement according to claim 7, wherein the selecting unit is further configured to clear the cache of an entry associated with said session in case no subsequent packet of the same session has been received upon time-out of said timer associated with said session.

14. A switch comprising the arrangement according to claim 7.

15. A router comprising the arrangement according to claim 7.

\* \* \* \* \*

UNITED STATES PATENT AND TRADEMARK OFFICE
CERTIFICATE OF CORRECTION

PATENT NO. : 8,917,724 B2
APPLICATION NO. : 13/581110
DATED : December 23, 2014
INVENTOR(S) : Thyni et al.

Page 1 of 1

It is certified that error appears in the above-identified patent and that said Letters Patent is hereby corrected as shown below:

In the Specification

In Column 2, Line 59, delete "f" and insert -- of --, therefor.

In Column 3, Line 21, delete "If is" and insert -- If it is --, therefor.

In Column 6, Line 6, delete "JAG" and insert -- LAG --, therefor.

In Column 7, Line 31, delete "unit." and insert -- units. --, therefor.

In Column 7, Line 36, delete "unit" and insert -- units --, therefor.

In Column 8, Line 29, delete "selecting unit 703" and insert -- selecting unit 704 --, therefor.

In Column 8, Line 47, delete "that" and insert -- that, --, therefor.

In the Claims

In Column 10, Line 18, in Claim 7, delete "on basis of" and insert -- on the basis of --, therefor.

Signed and Sealed this
Twenty-eighth Day of July, 2015

Michelle K. Lee
*Director of the United States Patent and Trademark Office*